United States Patent [19]

Cannone

[11] Patent Number: 4,980,252
[45] Date of Patent: Dec. 25, 1990

[54] GRID ELECTRODE FOR LEAD-ACID CELL

[75] Inventor: Anthony G. Cannone, Cranford, N.J.

[73] Assignee: AT&T Bell Laboratories, Murray Hill, N.J.

[21] Appl. No.: 454,082

[22] Filed: Dec. 21, 1989

[51] Int. Cl.$^5$ .............................................. H01M 4/73
[52] U.S. Cl. ................................................... 429/241
[58] Field of Search ........................ 429/241, 243, 211

[56] References Cited

U.S. PATENT DOCUMENTS

| | | | |
|---|---|---|---|
| 2,756,269 | 7/1956 | Harrison et al. | 429/243 |
| 3,083,250 | 3/1963 | Geissbauer | 429/241 |
| 3,556,853 | 1/1971 | Cannone | 136/36 |

Primary Examiner—Donald L. Walton
Attorney, Agent, or Firm—David I. Caplan

[57] ABSTRACT

A grid structure for the positive electrode of a lead-acid battery cell is composed of several substructures (modules), typically having mutually identical geometric designs. Each of the substructures includes a plurality of metallic members having closed geometric shapes, each contained within another, which satisfy a specific growth ratio relationship, namely, that the ratio of the surface area to cross-section area of any member is no greater than such ratio for a member contained within it. In a preferred embodiment, each such substructure is composed of a plurality of concentric rectangles, each (except the outermost) contained within another. Each rectangle is formed by four lead (or lead alloy) rod-like strips. The ratio of surface area to the cross section for the strips of any given rectangle located in any angular sector is no greater than such ratio for the strips located in that same sector within the given rectangle, whereby long useful battery cell lifetime is prolonged in a desirable rectangular battery configuration.

12 Claims, 3 Drawing Sheets

GRID ELECTRODE FOR LEAD-ACID CELL

TECHNICAL FIELD

This invention relates to storage battery cells and more particularly to grid designs for positive electrodes (plates) in lead-acid batteries.

BACKGROUND OF THE INVENTION

In a typical storage battery, such as a lead-acid battery, electrode grids are suspended in an acid contained within a cell having plastic walls. Each of the positive electrode grids typically is composed of a metallic lead or lead alloy grid structure composed of metallic grid members. A chemically active material is located within, and is held by, each positive electrode grid. This material is typically a chemically active paste. The cross section of the grid members is typically hexagonal, in order to hold the paste firmly in place.

A major cause of premature failure of storage battery cells, particularly lead-acid cells, involves growth of the electrode grids in such cells, particularly the grids of positive polarity. This growth typically is caused, at least in part, by the formation of lead oxides on the positive grid. In turn, the spacings (distances) between the positive grid members tend to increase in all directions, whereby the grid tends to expand or grow away from all sides of active material or paste located within the grid structure. At the same time, the active material or paste does not remain sufficiently flexible to adjust to the changes in spacings. Hence, the grid members pull away from, and loses physical contact with, the active paste material. Consequently, a significant drop in the retrievable electrical storage capacity of the pasted grid prematurely results, whereby a significant decrease in the useful lifetime of the battery results. The loss of physical contact can also increase to such an extent that some of the paste drops from the grid and falls to the bottom of the cell, whereby other problems can arise, such as electrical shorting of positive to negative electrodes, whereby battery lifetime likewise is undesirably decreased.

In U.S. Pat. No. 3,556,853, issued to me on Jan. 19, 1971, entitled "Grid for Lead-Acid Cell," a positive electrode grid structure was disclosed which alleviated the foregoing problem. The structure involved a plurality of metallic grid (structural) members each having a closed geometric shape (contour)—for example, a plurality of concentric rings—each (except for the outermost) being enclosed within another—joined together by interconnecting metallic support members, to form a unitary (one-piece) electrode structure. These structural members were dimensioned such that the ratio of the (outer) surface area to the cross-section area—i.e., the "growth ratio"—for any specified structural member was no greater than such ratio for all structural members contained within the specified member. The (outer) surface area of a structural member was defined as the product of circumference and perimeter. Although such a grid structure, satisfying such a growth ratio relationship, yielded significant improvements in useful battery lifetime, it imposed an undesirably low upper limit upon the overall size and hence electrical capacity of the cell for a given diameter thereof. This low upper limit arose because, for a given innermost structural member, the outermost structural member had to be made so thick that not enough (if any) space between structural members remained for sufficient (if any) paste. Conversely, for a given outermost structural member, the innermost structural members had to be made too thin to be practical.

It would therefore be desirable to have a new design for grid electrode structure which alleviates the foregoing problem.

SUMMARY OF THE INVENTION

The foregoing problem is alleviated by using a modular (building-block) approach to the design of a grid structure for the positive electrode of a storage battery cell, typically a lead-acid storage cell. Each such substructure includes metallic structural members which define closed geometric shapes, each (except the outermost) contained with another. All substructures advantageously have substantially the same grid design. The structural members are joined together by interconnecting metallic support members. Adjacent substructures (modules) share one or more of their outermost portions with one another, to form a unitary electrode structure. The dimensions of the grid members (or portions thereof) satisfy the growth relationship similar to the one specified in my aforementioned U.S. Pat. No. 3,556,853, namely, that the growth ratio of a specified portion of any specified member is no greater than that of the portion of any member contained within the specified portion of the specified member.

In a specific embodiment, the design of the grid structure has an overall configuration of a rectangle (including a square), as does each of its substructures. Moreover, each of the substructures is composed of concentric rectangular (or square) metallic support members. Each such rectangular support member is composed of four rod-like portions (segments), each of which forms a side of a rectangle. The growth ratio of any specified such portion of any specified rectangular support member advantageously is no greater than that of the portion of any other support member located within the specified member, the latter portion being oriented parallel to the specified member and at the same time being located closer to the center of the substructure that the specified portion. Advantageously the cross sections of the structural members, as well as of metallic support members interconnecting the structural members, are hexagonal or hexagonal-like, in order to hold the chemically active material firmly in place.

BRIEF DESCRIPTION OF THE DRAWING

This invention together with its features, characteristics, and advantages, can be better understood from the following detailed description which read in conjunction with the drawings in which.

Figure 1:
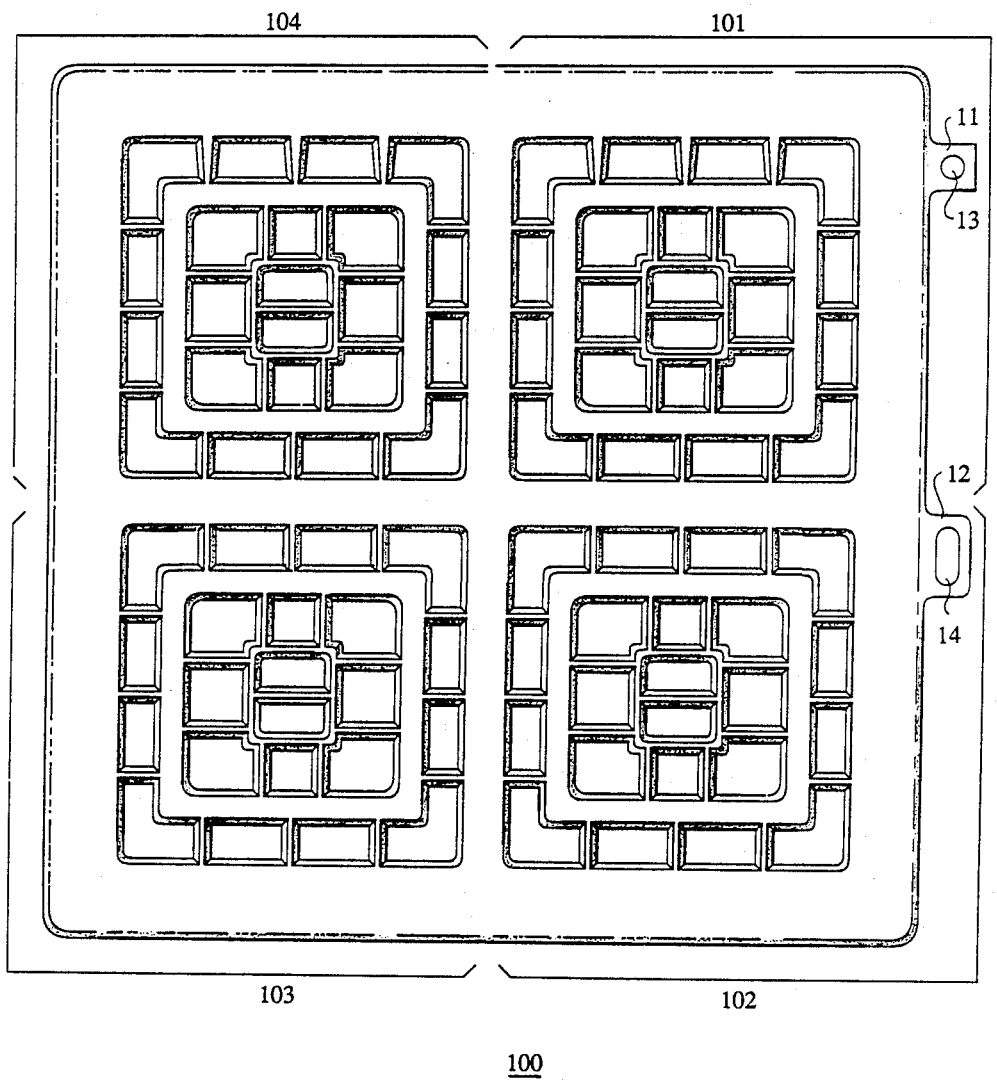
FIG. 1 is a top view of a grid structure in accordance with a specific embodiment of the invention.
Figure 2:
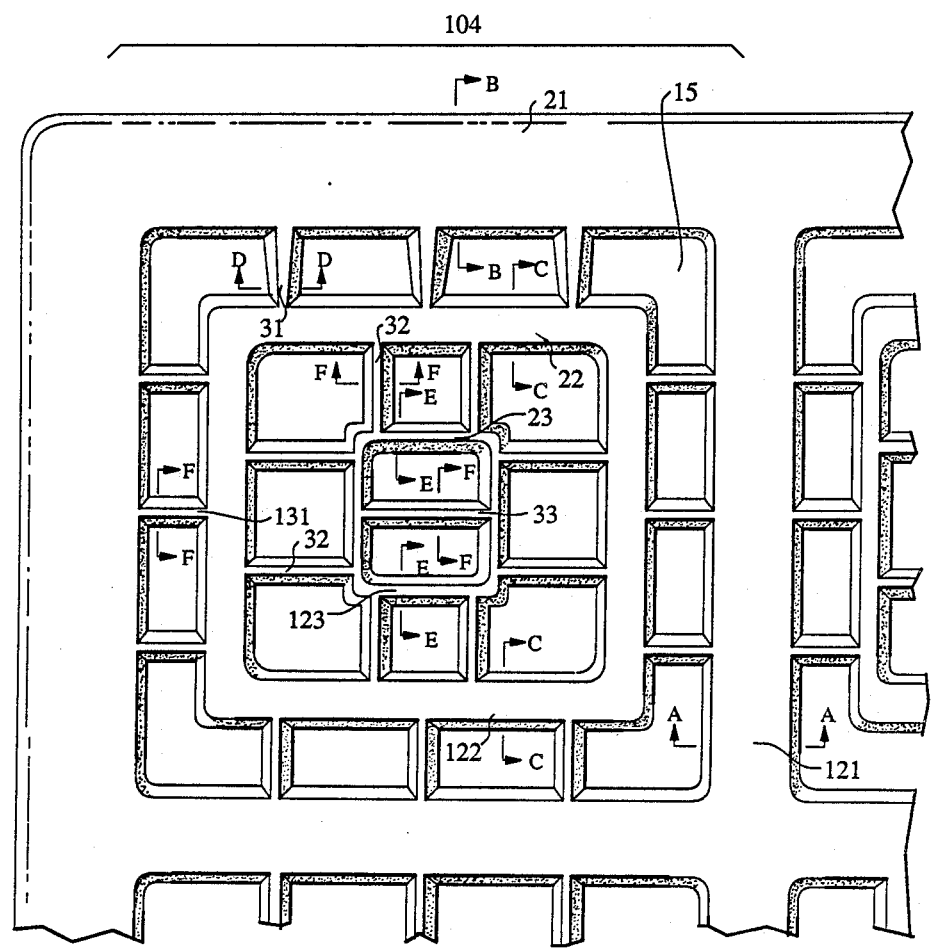
FIG. 2 is a top view of a portion of the grid structure shown in FIG. 1 enlarged by a factor of approximately one and two-thirds.
Figure 3:
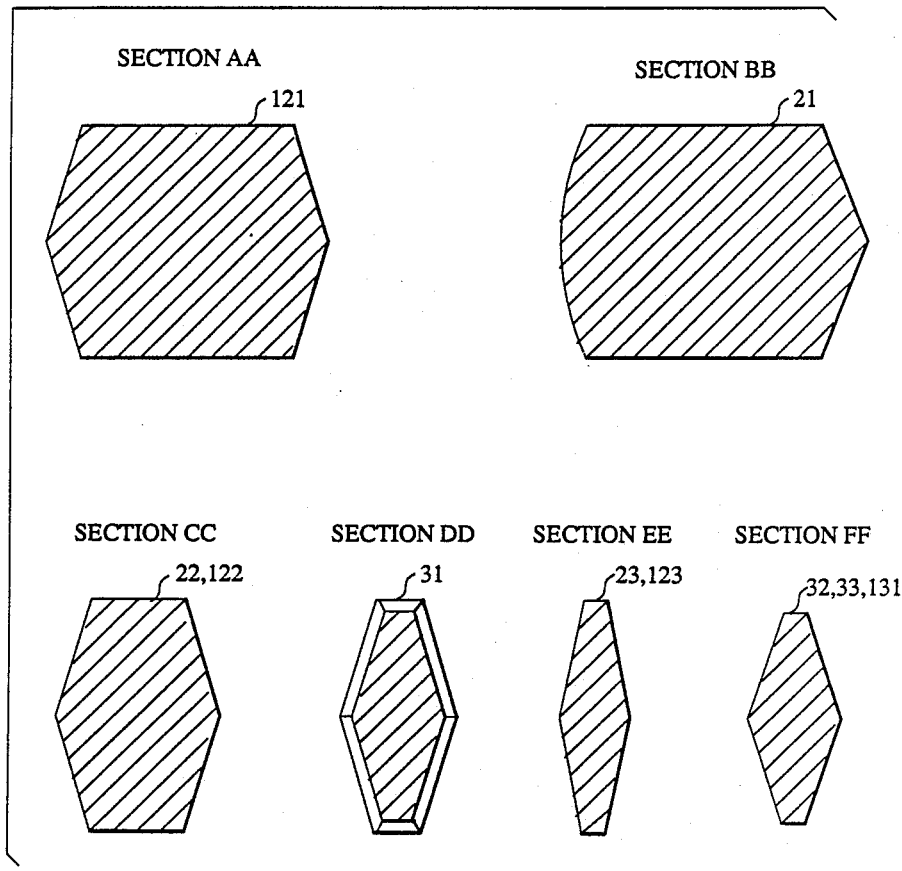
FIG. 3 is a cross-sectional view along line 2—2 of FIG. 2.

The scale of FIG. 3 is approximately two and one-half times that of FIG. 2. Only for the purpose of fitting FIGS. 1 and 2 onto the page, the lengths of the grid and support members have been shortened relative to their widths.

DETAILED DESCRIPTION

FIG. 1 shows a generally rectangular electrode grid structure 100 composed of mutually substantially identical substructurers 101, 102, 103, 104—illustratively four in number. FIG. 2 is an enlarged top view mainly of the substructure 101. Support lugs 11 and 12, supplied with apertures 13 and 14, respectively, are attached to the substructures 101 and 102, respectively, to enable the structure 100 to be held mechanically in place in a battery cell by means of a pair of rods (not shown) fitting in the apertures 13 and 14. Typically, more than one such structure 100 is held by the rods, to form a multiple electrode assembly for the single battery cell. The lug 11 also serves as a means for electrical contact to an electrical strap or cable (not shown), as known in the art, to which the electrode structure 100 is attached while it is immersed in an electrolytic fluid (typically an acid) in the battery cell.

The cross sections and spacings of various elements of electrode structure 100 are exemplified in FIG. 3, with special reference to the substructure 104 (to which the other substructures 101-103 are substantially identical except as mentioned below). The substructure 104 is formed by rectangular metallic structural grid members 21, 22, and 23 interconnected by interconnecting metallic support members 31, 32, and 33. The interconnecting members 31, 32, and 33 provide mechanical support for the rectangular structural members 21, 22, and 23—to form a unitary structure. Parts 121 of the rectangular member 21 are shared (in common) by the substructure 104 with each of the substructures 101, 102, and 103.

The structure 100 can be formed by a known casting procedure. By a known method, the spaces 15 between the metallic members are filled or pasted with appropriate active material. Initially this active material is flexible, and good electrical contact can be obtained between the material and the structural members. As the cell in which the electrode 100 ages, the spaces 15 change either in size or in shape (or in both), whereby a loss of contact between the active material and the structural members eventually tends to cause an unacceptably premature loss in the retrievable capacity of the storage cell.

In lead-acid cells, such changes in the spaces occur in the positive electrode because the structural members grow or expand in size as a result, at least in part, of the formation of lead oxides on these members. As discussed above in connection with my U.S. Pat. No. 3,556,853, the aforementioned premature loss in battery capacity can be avoided by dimensioning the members such that the "growth ratio" of any specified structural member was no greater than that of any other structural member contained within the specified member. Accordingly, in order to avoid premature aging of the electrode 100 the members, 21, 22, and 23 are likewise dimensioned as to growth ratios. In particular, for example, the growth ratio of that portion 121 of the structural member 21 which is parallel to the X direction is no greater than the growth ratio of the portion 122 of the member 22, also parallel to the X direction, situated between that portion of the structural member 22 and the parallel portion of the structural member 23. For another example, the growth ratio of that portion 122 of the structural member 22 which is parallel to the Y direction is no greater than the growth ratio of the portion 123 of the member 23, also parallel to the Y direction, situated between the aforementioned portion of the structural member 22 and the center of the substructure 104.

As to the dimensions of the interconnecting members, they are selected to minimize the effects of growth on the unwanted expansion of the interconnecting members, which undesirably increases the distances between the concentric retangles. These dimensions can be determined by trial and error or by calculations of growth profiles.

The electrode structure 100 can be fabricated as a unitary (one-piece) structure by known metallic casting techniques.

All structural grid members 21, 22, 23 have the same uniform height in the direction perpendicular to the plane of FIG. 2, for ease in casting the structure 100. The interconnecting support members 32 and 33 have a uniform height (typically about 0.175 inches) which is typically less than the typically uniform height (typically about 0.200 inches) of the structural members 21, 22, and 23.

The interconnecting support member 31 located along the same row (along the X direction) as the support lug 11 advantageously have linearly tapered heights and widths, typically in the approximate amount of a 12% taper, such that the cross sections of these members 31 contiguous to the (outermost) structural member 21 are larger than their cross sections contiguous to member 22 (where their cross sections are the same as those of interconnecting support members 32 and 33), again for ease and reliability in casting. Interconnecting support members 131, joining the grid members 21 and 22, typically are not tapered and typically have heights equal to those of interconnecting support members 32 and 33. Thus the only other tapered support members in the structure 100 are the interconnecting members 31 located in the substructure 101 (and not in the substructures 103 and 104). The overall dimensions of the structure 100 is typically about 7.00 inches in the X-direction by 6.50 inches in the Y-direction.

Although the invention has been described in detail with reference to a specific embodiment, various modifications can be made without departing from the scope of the invention. For example, instead of just four electrode grid substructures, fewer or more than four such substructures can be joined together in one or more rows, to form an electrode structure. Also, geometric shapes other than rectangles—such as triangles or hexagons—can be closely packed together to form electrode structures or substructures, in which each substructure comprises a plurality of structural members having closed geometric shapes satisfying the specified growth ratio relationship and in which portions of outermost structural members of adjacent substructures are shared in common.

I claim:

1. An electrode grid structure for a lead-acid battery cell comprising:
    (a) a first substructure having a grid design which includes a plurality of metallic structural members which define a plurality of closed geometric shapes,
    each such structural member, except the outermost, enclosed within another,
    each such structural member having portions thereof whose surface area to cross-section area is no greater than such ratio for the portion of any structural member contained within the specified portion of the specified member, interconnecting metallic members connecting adjacent structural members for mechanical support and electrical interconnection; and (b) a second substructure having a grid design in accordance with the first substructure, the first and second substructures each having a portion of its outermost structural member in common with each other, whereby the first and second substructures together form a unitary structure.

2. A lead-acid battery cell contain at least one electrode structure in accordance with claim 1.

3. An electrode in accordance with claim 1 further comprising a chemically active material located in the space between at least a pair of adjacent structural members.

4. An electrode grid structure according to claim 1 in which all geometric shapes are rectangular.

5. A structure according to claim 4 in which at least some of the structural members have hexagonal cross sections.

6. A structure according to claim 1 in which at least some of the structural members have hexagonal cross sections.

7. An electrode grid structure in accordance with claim 1 further comprising:

third and fourth substructures each having a grid design in accordance with the first substructure, the second and third substructures each having a portion of its outermost member in common with each other, the third and fourth substructures each having a portion of its outermost member in common with each other, and the fourth and first substructures each having a portion of its outermost member in common with each other, whereby the first, second, third and fourth substructures together form a unitary structure.

8. A lead-acid battery cell containing at least one electrode structure in accordance with claim 7.

9. An electrode in accordance with claim 7 further comprising a chemically active material located in spaces between adjacent members.

10. An electrode grid structure according to claim 7 in which all geometric shapes are rectangular.

11. A structure according to claim 10 in which at least some of the members have hexagonal cross sections.

12. A structure according to claim 7 in which at least some of the members have hexagonal cross sections.

* * * * *